(12) United States Patent
Calmes et al.

(10) Patent No.: US 10,780,645 B2
(45) Date of Patent: Sep. 22, 2020

(54) METHOD AND APPARATUS FOR CREATING POUCHES OR BAGS WITH MULTIPHASE SEALING

(71) Applicant: CMD Corporation, Appleton, WI (US)

(72) Inventors: Casey J Calmes, Neenah, WI (US); Peter T Hunnicutt, Greenville, WI (US); Curt A Frievalt, Green Bay, WI (US); Mark C Krueger, Green Bay, WI (US); Jason P Plutz, Kaukauna, WI (US)

(73) Assignee: CMD Corporation, Appleton, WI (US)

( * ) Notice: Subject to any disclaimer, the term of this patent is extended or adjusted under 35 U.S.C. 154(b) by 0 days.

(21) Appl. No.: 16/530,576

(22) Filed: Aug. 2, 2019

(65) Prior Publication Data

US 2019/0366647 A1    Dec. 5, 2019

Related U.S. Application Data

(62) Division of application No. 15/374,060, filed on Dec. 9, 2016, now Pat. No. 10,399,273.

(Continued)

(51) Int. Cl.
*B31B 70/00* (2017.01)
*B29C 65/00* (2006.01)
(Continued)

(52) U.S. Cl.
CPC .............. *B29C 65/08* (2013.01); *B29C 65/18* (2013.01); *B29C 66/0242* (2013.01);
(Continued)

(58) Field of Classification Search
CPC ......... B31B 70/00; B31B 70/60; B31B 70/64; B31B 70/80; B31B 70/81; B31B 70/813; B31B 70/8131; B29C 65/00; B29C 65/08; B29C 65/10; B29C 65/18; B29C 66/00; B29C 66/02; B29C 66/024; B29C 66/0241; B29C 66/10; B29C 66/11; B29C 66/112;
(Continued)

(56) References Cited

U.S. PATENT DOCUMENTS 6,976,946 B2 *  12/2005  Wied ...................... B31B 23/00
                                                              493/3
7,191,575 B2    3/2007   Frievalt et al.
(Continued)

FOREIGN PATENT DOCUMENTS

CN    101312672 A    11/2008
CN    104742410 A     7/2015
(Continued)

OTHER PUBLICATIONS

International Search Report and Written Opinion for PCT/US2016/065845, dated Apr. 5, 2017, European Patent Office, Rijiswijk Netherlands.

(Continued)

*Primary Examiner* — Jacob T Minskey
*Assistant Examiner* — Matthew Hoover
(74) *Attorney, Agent, or Firm* — Andrus Intellectual Property Law, LLP

(57) ABSTRACT

A method and apparatus for forming pouches and/or bags is disclosed. A seal and/or insert is crushed using a multiphase sealer or crusher.

11 Claims, 9 Drawing Sheets

Related U.S. Application Data

(60) Provisional application No. 62/265,639, filed on Dec. 10, 2015, provisional application No. 62/265,632, filed on Dec. 10, 2015.

(51) Int. Cl.

| | | |
|---|---|---|
| *B65B 61/00* | (2006.01) | |
| *B65D 33/00* | (2006.01) | |
| *B29C 65/08* | (2006.01) | |
| *B31B 70/64* | (2017.01) | |
| *B31B 70/81* | (2017.01) | |
| *B29C 65/18* | (2006.01) | |
| *B65B 61/18* | (2006.01) | |
| *B65D 33/16* | (2006.01) | |
| *B65D 33/25* | (2006.01) | |
| *B29L 5/00* | (2006.01) | |

(52) U.S. Cl.
CPC ........ *B29C 66/1122* (2013.01); *B29C 66/472* (2013.01); *B29C 66/71* (2013.01); *B29C 66/73774* (2013.01); *B29C 66/8246* (2013.01); *B29C 66/8322* (2013.01); *B29C 66/8511* (2013.01); *B29C 66/9192* (2013.01); *B29C 66/9241* (2013.01); *B29C 66/9261* (2013.01); *B29C 66/92443* (2013.01); *B29C 66/92921* (2013.01); *B29C 66/934* (2013.01); *B31B 70/64* (2017.08); *B31B 70/8131* (2017.08); *B65B 61/188* (2013.01); *B65D 33/16* (2013.01); *B65D 33/2508* (2013.01); *B29C 66/91933* (2013.01); *B29C 66/961* (2013.01); *B29K 2023/06* (2013.01); *B29L 2005/00* (2013.01); *B31B 70/006* (2017.08); *B65D 2313/02* (2013.01)

(58) Field of Classification Search
CPC ..... B29C 66/1122; B29C 66/40; B29C 66/47; B29C 66/472; B29C 66/70; B29C 66/71; B29C 66/73; B29C 66/737; B29C 66/7377; B29C 66/73774; B29C 66/80; B29C 66/82; B29C 66/824; B29C 66/8246; B29C 66/83; B29C 66/832; B29C 66/8322; B29C 66/85; B29C 66/851; B29C 66/8511; B29C 66/90; B29C 66/91; B29C 66/919; B29C 66/9192; B29C 66/92; B29C 66/924; B29C 66/9241; B29C 66/9244; B29C 66/92443; B29C 66/926; B29C 66/9261; B29C 66/929; B29C 66/9292; B29C 66/92921; B29C 66/93; B29C 66/934; B65B 61/00; B65B 61/10; B65B 61/18; B65B 61/188; B65D 33/00; B65D 33/10; B65D 33/16; B65D 33/20; B65D 33/25; B65D 33/25; B65D 33/2508

See application file for complete search history.

(56) References Cited

U.S. PATENT DOCUMENTS

| | | |
|---|---|---|
| 7,325,379 B2 | 2/2008 | Kettner et al. |
| 2004/0091179 A1* | 5/2004 | Anderson .......... B65D 33/2591 383/63 |
| 2011/0207589 A1* | 8/2011 | Moran ................ B29C 66/8322 493/196 |
| 2014/0332138 A1 | 11/2014 | Hunnicutt et al. |
| 2015/0183176 A1 | 7/2015 | Totani |
| 2017/0014964 A1 | 1/2017 | Neff |

FOREIGN PATENT DOCUMENTS

| | | |
|---|---|---|
| GB | 2349603 | 11/2000 |
| WO | 2007050691 | 5/2007 |

OTHER PUBLICATIONS

International Preliminary Report on Patentability for PCT/US2016/065845, dated Jun. 12, 2018, International Bureau of WIPO, Geneva Switzerland.

* cited by examiner

METHOD AND APPARATUS FOR CREATING POUCHES OR BAGS WITH MULTIPHASE SEALING

RELATED APPLICATIONS

This is a division of, and claims the benefit of the filing date of U.S. patent application Ser. No. 15/374,060, filed on Dec. 9, 2016, which is a continuation in part of, and claims the benefit of the filing date of, U.S. Provisional Patent Application No. 62/265,639, filed on Dec. 10, 2015, which is a continuation in part of, and claims the benefit of the filing date of, U.S. Provisional Patent Application No. 62/265,632, filed on Dec. 10, 2015.

FIELD OF THE INVENTION

The present disclosure relates generally to the art of making pouches or bags, and more particularly to the art of making pouches or bags using a multiphase sealer.

BACKGROUND OF THE INVENTION

There are many known stand up pouch machines, and this invention will be explained in the context of pouch machines such as the CMD® Stand-Up Pouch Machine® or that shown in U.S. Pat. Nos. 6,976,946, 7,191,575 and 7,325,379, each of which are hereby incorporated by reference, and US Patent Publications US-2014-0332138-A1 and US-2011-0207589-A1, each of which are also hereby incorporated by reference. One example of a prior art pouch machine with a zipper crush section includes an unwind or infeed section, followed by a forming or folding section, followed by a machine direction bottom seal and zipper flange sealing section, followed by a zipper crush section, followed by a side sealing section, followed by other processes such as cut off, hole punch, etc. The film is advanced and stopped, and each section operates on the portion of the film in that section. Then, when the operations are complete, the film is advanced, and each section again operates. When the film has completed the path through the machine each operations has been performed on the film, thus creating the pouch.

Pouch design have become complex, such as having any of a number of features, including closable zippers, easy open tear strings, product protecting venting, etc. These features are added with insert material or materials that are different than and/or have a different thickness than the pouch body or substrate material. Insert, as used herein, refers to a feature such as a closure (zipper, hook and loop, press to close, etc), a tear strip, a vent, plugs, valves, spouts, strips, etc. that are comprised of materials different than and/or have a different thickness than the materials comprising the pouch body or substrate.

An insert, such as a zipper, is typically provided as a continuous strip (or strips) which must be compressed (crushed) and sealed to the pouch. The portion of the zipper near the edge of the pouch must be sealed to properly seal the pouch. The prior art machines were costly to operate and often made poor seals around the insert and/or took too much time.

It is difficult to crush and seal inserts to the substrate because the insert or zipper is thicker than the pouch, and comprised of a different material. Creating consistently strong seals requires the sealing pressure be uniform across the length of the seal and the additional thickness of the insert material causes inconsistent pressure in the seal area.

The prior art typically sealed the edge of the zipper/pouch by either crushing it with a modified sealer (called a zipper crush or zipper crush sealer), or heating it with ultrasound. Crushing the zipper minimizes the seal pressure differences along the length of the side seal. If inserts are not sufficiently crushed there will be insufficient pressure to create a seal between the pouch substrates were it intersects the insert material FIG. 1 shows a cross sectional view of a zipper insert 102 inserted between two layers 104 and 106 of a pouch substrate. FIG. 2 shows the zipper insert and substrates after crushing.

Crushing the insert in one step directly from its original thickness to the final thickness makes it more likely for the seals to be fractured. Thus, prior art machines sometimes included two separate sealers/crushers. The first sealers/crusher crushed the zipper most of the way, and the second sealers/crusher crushed the zipper to the final desired thickness. Even with two conventional crushing stations, pouch converters needed to run at slower than desired speeds to create strong seals with zipper material because of fractured seals.

Crushing and sealing the insert requires a heat source, pressure, and time. The heat source must have enough thermal mass to melt the insert material and enough rigidity to maintain its shape even with significant crush pressure. A hot bar (sometimes called a seal head or platen) is typically used in the prior art. Most prior art pouch machines use continuous pressure systems to crush insert materials. These crushing unit are typically adaptations of a cross seal head station. Pneumatic cylinders, or springs are used to create the continuous pressure (either constant or gradually changing), and utilize heaters and tooling smaller than the cross sealers. This method is effective to flatten the insert but can create fractured seals and/or poor bond strength between the insert and substrate and/or between the insert materials. Seal heads can be driven with a servomotor and eccentric linkage, but this approach is more expensive than continuous pressure systems.

Prior art continuous crush pressure systems do not always provide consistent seal bond strengths. Crushing pressure is nominally constant with slight variations and is uncontrolled, open loop, and the continuous crushing force creates and maintains shear and stain stress. Shear stress is a force perpendicular to the crushing force and parallel to the plane created by difference in flow rates. Strain is created by intermolecular mechanical obstruction and friction, and is dependent on pressure and temperature.

Crush rate and final head position are determine by equilibrium—when the crushing pressure equals the shear resistance of material the head will stop. Therefore seal shear stress and intermolecular stress are considerable higher than desirable. Crystalline sections of the polymer chain may not uncoil and relax into their new position because the crushing force adds more intermolecular stain. If the amorphous sections are orientated in a direction not conducive to entangling, the crushing force will maintain strain and prevent further entanglement. This means oriented amorphous sections are unable to properly entangle due to the continuous crush pressure and stress it creates, and the crystalline section can spring back causing shear on the seal.

Prior art crush systems are limited in performance and cannot be optimized for seal strength and run rate. Running lower crush pressure will improve seals, but will require longer cycle time, which can limit machine run rates. Cycle rate can be minimized with higher pressures, but at the cost of higher shear and stain, and lower seal bond strength.

Accordingly, a machine and method to make pouches with inserts or make bags with seals that can consistently and economically create quality seals in a timely fashion without creating undue seal shear stress and intermolecular stain, is desired.

SUMMARY OF THE PRESENT INVENTION

According to a first aspect of the disclosure a pouch machine has an insert crush station with a multiphase crusher that receives an insert and a substrate.

According to a second aspect of the disclosure a pouch machine has an insert crush station that includes a controller with includes at least two of a pre-crush heating module, a controlled crushing module, and a crush setting module, that are consecutively operated.

According to a third aspect of the disclosure a method of making pouches includes feeding a substrate to an insert crush station, feeding an insert to the insert crush station, multiphase crushing of the insert and substrate and forming seals to create a pouch.

According to a fourth aspect of the disclosure a method of making pouches includes feeding a substrate to an insert crush station, feeding an insert to the insert crush station, and controlling an insert crush station to consecutively provide at least two or three of a pre-crush heating, a controlled crushing, and a crush setting of the insert and substrate.

The insert crush station includes a platen with a controller, and the controller has two or all of a pre-crush heating module, a controlled crushing module, and a crushing module that operate consecutively without returning to a home position between their operation, in one alternative. Platen, as used herein, refers to a bar, plate, or other device that is used to form a seal or to apply pressure and heat to a substrate and/or substrate and insert.

The insert crush station includes a servo motor operatively connected to move a multiphase platen in response to the controller, and an eccentric linkage and/or a screw driven actuator are connected to the platen and servo motor, to translate motion of the servo motor to motion of the platen in another alternative.

The eccentric linkage is active between 175 and 180 degrees from top dead center in another alternative.

The multiphase crusher includes a heat source but does not include an ultrasound source, and/or the pouch machine includes a second sealing station that forms a seal pattern to form a pouch, in one embodiment.

The insert is a zipper strip, a tear strip, and a vent strip, a press to close zipper strip, a hook and loop strip, a tear tape strip, and a plug and valve strip in various embodiments.

The pouch machine includes a second insert crush station that receives the substrate and insert in one alternative.

The pouch includes a controller with a distance module in one embodiment.

Other principal features and advantages of will become apparent to those skilled in the art upon review of the following drawings, the detailed description, and the appended claims.

Figure 1:
FIG. 1 is cross section of a zipper insert and a pouch substrate prior to crushing/sealing.
Figure 2:
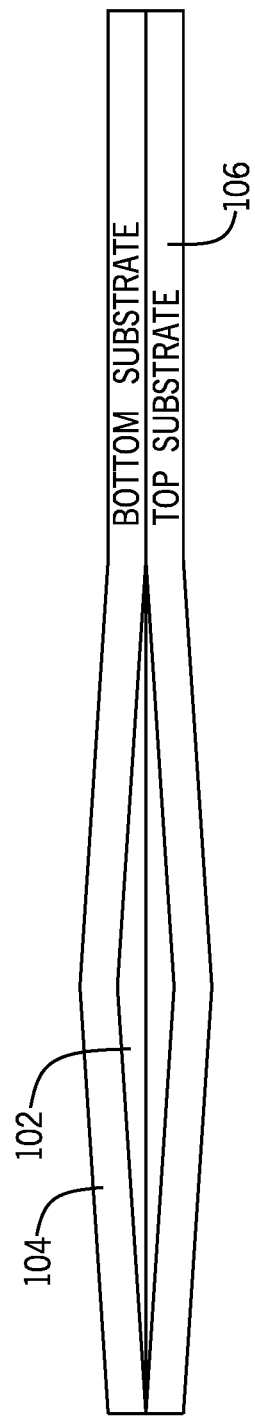
FIG. 2 is cross section of a crushed/sealed zipper insert and a pouch substrate.

Before explaining at least one embodiment in detail it is to be understood that the invention is not limited in its application to the details of construction and the arrangement of the components set forth in the following description or illustrated in the drawings. The invention is capable of being implemented with other embodiments or of being practiced or carried out in various ways. Also, it is to be understood that the phraseology and terminology employed herein is for the purpose of description and should not be regarded as limiting. Like reference numerals are used to indicate like components.

DETAILED DESCRIPTION OF THE PREFERRED EMBODIMENTS

While the present disclosure will be illustrated with reference to a particular implementation it should be understood at the outset that the pouch machine and method of making pouches can be implemented with other designs, components, and actions.

Generally, the method for making pouches includes multiphase crushing an insert, and the machine for making pouches includes an insert crush section that has a multiphase crusher. The section applies a multiphase crush to crush/seal an insert in multiple phases. The multiphase crush is performed by a single station. Additional crush stations may be used, but at least one station performs a multiphase crush. Other than the multiphase crushing, the machine and method can be consistent with the prior art. Single station, as used herein, refers to a location where a seal is formed or partially formed, without advancing the film to another location. Prior art zipper crush often used multiple stations, wherein the seal was partially formed at one station, then the film advanced and the seal was completed at a second station. One embodiment provides for multiphase sealing a bag.

Insert crush station, as used herein, refers to a station that applies energy to crush an insert and substrate to seal the insert to the pouch and/or film used to form the pouch. An insert crush section (or station) is a type of seal section. Multiphase crush, as used herein, refers to a crush performed by a platen or seal bar, wherein the crush has at least two phases, such as at least two of pre-crush heating (also called pre-crush phase or pre-heating phase), controlled crushing, and crushing. Multiphase crusher, as used herein, refers to a crush station that provides a multiphase crush (which can be heat or ultrasonic). Multiphase crushing, as used herein, refers to performing a multiphase crush.

The pouch machine preferably includes a controller that has modules to control each phase of the insert crush. The preferred embodiment provides that the controller include a pre-crush heating module that causes a platen to move in a pre-crush heating phase, a controlled crushing module that causes the platen to move in a controlled crush phase, and a crush setting module that causes the platen to move in a crush setting phase.

Controller, as used herein refers to the circuitry and software that controls operation of one or more of a pouch machine, sections of a pouch machine, or portions of a section of a pouch machine, and can include built-in controllers such as a controller that comes with a servo motor, and can be in a single location, or distributed over multiple locations. Control module or module, as used herein refers to software and circuitry that cooperate to perform one or more defined functions, and control hardware and software can be part of multiple modules.

Pre-crush module, as used herein refers to a control module that causes a multiphase sealer to include a pre-crush motion profile—that is a motion profile that results in pre-crush heating an insert before applying significant crush pressure to the insert. A pre-crush motion profile starts heating the surfaces and provides a more uniform temperature profile to lower intermolecular strain and seal shear stress. Pre-crush heating, as used herein, refers to heating a material to be crushed before applying crush pressure.

Controlled crushing module, as used herein refers to a control module that causes a multiphase sealer to include a controlled crush motion profile—that is a motion profile that results in a controlled crush rate and pressure. Controlled crushing, as used herein, refers to crushing an insert at a controlled crush rate and pressure.

Crush setting module, as used herein, refers to a control module that causes a multiphase sealer to include a crush setting motion profile—that is a motion profile that results in heating with molecular relaxation and without additional pressure beyond that created by the crushing motion. A crush setting motion profile allows the displaced molecules to relax, and/or reduces intermolecular strain, which aids in the crushed material holding its new shape, and reduces the likelihood that the material springs back creating seal shear stress. Crush setting, or setting a crush, as used herein refers to heating an insert to obtain molecular relaxation and without additional crush pressure to allow displaced molecules to relax, and/or reduce intermolecular strain.

The preferred embodiment will be described with respect to a zipper insert and a zipper strip. Alternative embodiments provide for any type of insert, including hook and loop closures, press to close closures, a tear strips, vents, plugs, valves, spouts, strips, etc. Insert, as used herein, refers to a feature such as a such as a closure (zipper, hook and loop, press to close, etc), a tear strip, a vent, plugs, valves, spouts, strips, etc. that is comprised of materials different from, or having a different thickness than, the materials comprising the pouch body or substrate. Insert strip, as used herein, refers to a strip of inserts. Tear strip, as used herein refers to an insert strip used to create a tear strip as part of a pouch. Vent strip, as used herein refers to an insert strip used to create a vent as part of a pouch. Zipper strip, as used herein refers to an insert strip used to create a zipper as part of a pouch.

The preferred embodiment provides that the film or substrate follow a film path including (in this order) an unwind or infeed section, followed by a forming or folding section, followed by a machine direction bottom seal and zipper flange sealing section with a zipper infeed to provide the zipper strip, followed by a zipper crush section, followed by a side sealing section, followed by other processes such as cut off, hole punch, etc. Side seals refer to the seals that typically extend vertically along the side of the pouch when the pouch is standing. The flange of the zipper is sealed to the pouch—the zipper is sealed to the pouch across what will be horizontal and near the top when the pouch is upright and in use (standing). Alternative embodiments have the zipper (or other insert) in different locations. The zipper is crushed where the zipper is in the side seal region using the multiple phases described herein. Typically between one and five cross seals are used to form the sides of the pouch. Every action except the zipper crush can be consistent with the prior art.

The zipper crush includes a motion/heating profile of lowering the platen providing the zipper crush to a first position where the zipper is contacted with light, non-crushing pressure, thus preheating the zipper (the precrush phase). Then, the platen is lowered to a crushed or crushing position (the controlled crush phase), and the platen dwells in the crushed position (the crush setting phase). The specific profile can vary with the desired application.

Figure 5:
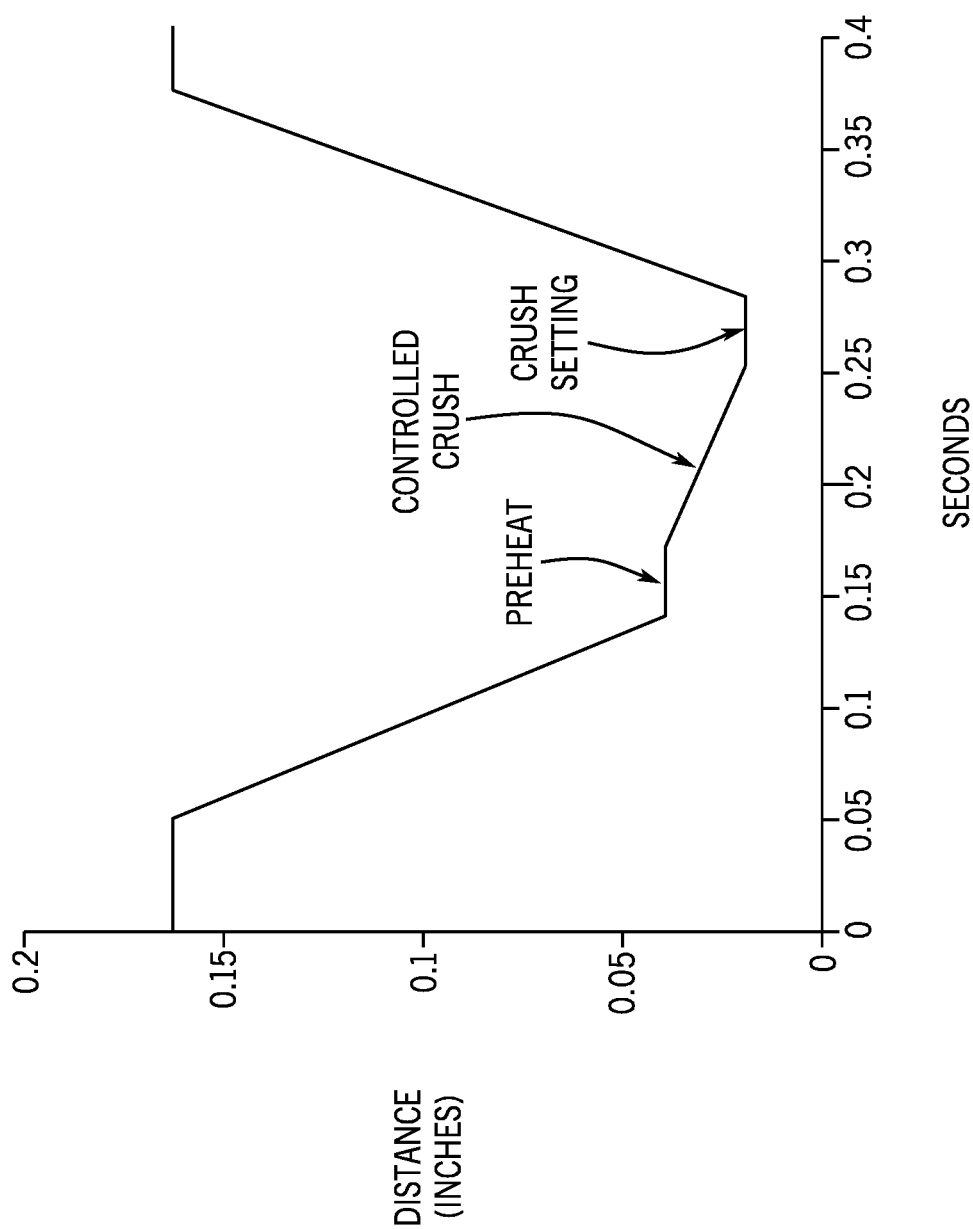
FIG. 5 shows a graph of a multi phase crush.

One embodiment provides for a profile shown in FIG. 5 that includes an initial (no contact) position of 0.165 inches, and rapidly lowering the sealer 0.125 inches from the initial position to 0.04 inches (in 90 msecs), where it contacts the zipper. The distances described herein vary with material type and thickness, and are merely exemplary. This position is held for 30 msecs in the preheat phase. Then the sealer is lowered 0.02 inches over the next 80 msec while the zipper is being crushed, Next, the sealer is held at the same distance for 40 msec while the crush is setting (the crush setting phase). The sealer then rapidly returns to the starting position.

Alternative profiles include maintaining the initial position for between 0.01 seconds and 0.0765 seconds, depending on the time needed to crush the insert. The platen can stop at between 0.001 inches (for no zipper) and 0.012 inches (for a spout), depending on the thickness of the insert. The length of time the position is held varies depending on the material. The time should be long enough to soften the material so it won't fracture in the crushing phase. Thicker material requires more time. The sealer is lowered an amount depending on the material thickness and type during the controlled crushing phase. Over the next 80 msec while the zipper is being crushed, Next, the sealer is held at the same distance for 40 msec while the crush is setting (the crush setting phase). The sealer then rapidly returns to the starting position.

Another embodiment provides for a motion profile that includes rapidly lowering the sealer 0.2 inches from the initial position, so that it contacts the zipper. Then, the sealer is lowered 0.05 inches over the next 25 msec while the zipper is being preheated (in the preheat phase). Alternatives include lowering the sealer 0.005 inches, or not lowering it at all in this phase or stage. The sealer is then lowered another 0.25 inches over the next 50 msec which crushes the zipper (in the crush phase). Alternatives provide for lowering the sealer 0.05 inches in this stage. The sealer then dwells at the crush height for 25 msec (in the crush setting phase), and then rapidly returns to the starting position.

The multiphase crushing enhances side seal bond strengths by reducing intermolecular strain and seal shear. During the pre-crush heating phase the insert material is heated without pressure, and starts heating the surfaces. Additionally this "pre-crush heating" provides a more uniform temperature profile which lowers intermolecular strain and seal shear stress.

During the controlled crush phase seal strength can be optimized by balancing heat transfer and molten material flow/displacement and by controlling the rate of crush.

Balancing heat and mass transfer reduces both molecular strain and shear stress on the sealing area.

During the crush setting phase, the displaced molecules relax, reducing intermolecular strain. The result is crushed material that is more likely to hold its new shape. Without this relax phase, the material can spring back creating stresses on the seal.

The multiphase crushing provides a more uniform temperature and flow resulting in lower shear stress, and stronger seals that are less likely to be fractured than the prior art single phase crushing. Also, the crush setting phase allows crystalline sections of the polymer chain to uncoil and relax into their new position. This is in contrast to the prior art single phase crushing that provided a crushing force that added intermolecular stain. When the crushing force is released by the crush setting phase of this disclosure, the stain stress is reduced, and the crystalline section will relax and spring back into a mostly crushed position.

The preferred embodiment uses a zipper/insert crush station having a servo actuated linear screw. The servo motor provides the desired motion control, and the screw translates the servo motion to the linear motion desired for moving the platen a precisely controlled distance at a precisely controlled rate, to provide the three phase crush. The servomotor can easily create the desired three phases during the crush cycle, allowing materials to heat, seal, and flow with reduced shear and strain. Various embodiment use the linear actuated screw servomotor with or without feedback control.

The preferred motion control provides desired side seal bond strengths and fewer fractured seals. Because the servomotor and head position are directly linked, servomotor error can be minimized and feedback control is possible. Error is minimized with the use of gearing and the error is uniform though the distance of travel. Using feedback control there is no excessive pressure and small or no air gaps. As the material heats head displacement and material flow are minimized, reducing shear stress.

Figure 6:
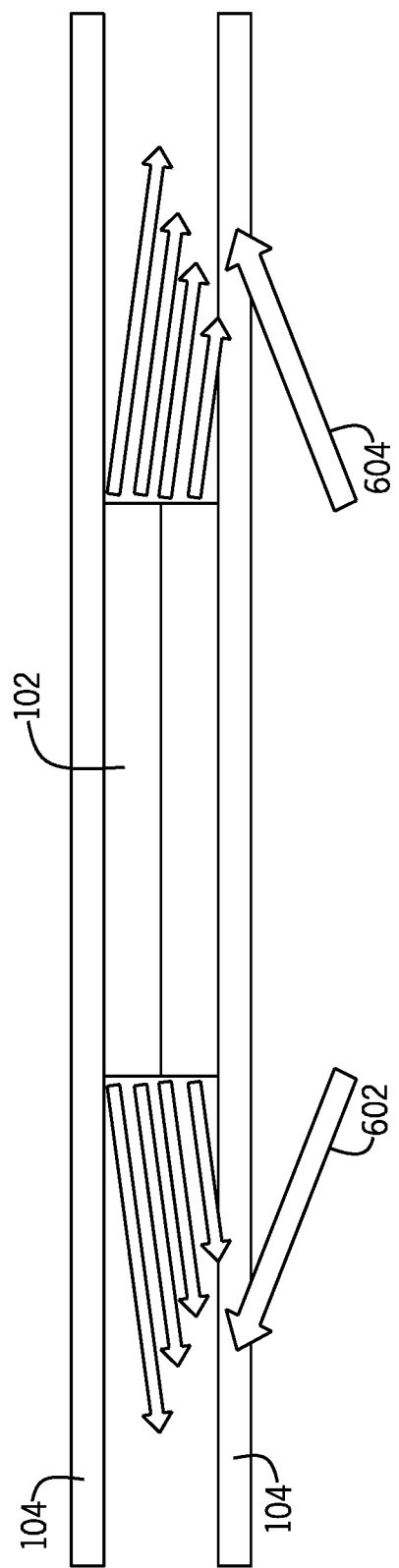
FIG. 6 shows an insert after flowing during the preheat and crush.

The temperature profile through the insert material being crushed is not uniform during the first two phases of the crush motion profile. At any given time during the first two phases, and partially into the third phase, of the motion profile the temperature of some portion of the insert material nearest the heated crushing die can be as much as 40% to 50% above the melt temperature of the insert material. Polymers at the sealing surface are heated close to melt temperature and amorphous chain can start entangling in the preheat phase. Variations of temperature at the sealing surface are reduced compared to the temperature variations produced by prior art continuous pressure system. Uniform temperatures of the insert material result in seals that are formed with minimal shear and strain The preferred embodiment provides a short heating time to allow the material temperatures and viscosities to become more uniform and at similar rates. As a result, the material flows at a lower temperature and requires less heat to overcome the shear and strain. FIG. 6 shows insert 102 flowing as indicated by arrows 602 and 604.

Entangling of the amorphous chains may or may not occur as the insert is crushed. Because temperature is more uniform, the material flow will be similar and the seal shear stress will be reduced, which result in less untangling. Control of the head allows for seal strength and cycle time to be optimized by balancing pre-crush heating time, heating bar temperature and crush rate. These settings will changed based on material heat capacity, thermal conductivity, viscosity and volume of material to displace.

Figure 7:
FIG. 7 shows three polymer entangling their chains.

The crush setting phase begins when the platen or head stop at the target thickness. Without the crushing force, flow stops and shear stress is eliminated; and intermolecular strain stress dissipates. Molecules can relaxation, allowing crystalline chains to nest, amorphous chains entangle, and sealing occurs. FIG. 7 shows three entangled polymer chains. The crushed material is more likely to hold its new shape and material spring back can be minimized, along with the shear stress it creates, when the chains are entangled. When the head stops at the desired position and thickness there is process consistency, and intermolecular strain is minimized along with spring back and seal shear.

During sealing, individual polymer chains stay connected to one another from intermolecular mechanical entanglement—there is no chemical reaction or chemical bonding between molecules. In thermal plastic substrates, the extrusion process creates entanglement due to time, temperature, and pressure. The degree of entanglement is subject to, among other things, temperature profile, length of barrel, screw geometry and screw RPM's. Sealing thermoplastics is done by applying pressure and heat over time, allowing the polymer chains to entangle. Pressure ensures conductive energy transfer and good contact between the sealing surfaces, which allows the chain to entangle. Temperature is a measurement of molecular energy and vibration; this vibration allows the polymer chains at the sealing surface to move, expand and entangle with one another. Time is critical to create the vibration and to allow entanglement of chains. The preferred embodiment consistently results in quality seals by providing crush phases that allow for the desirable entanglement.

Figure 8:
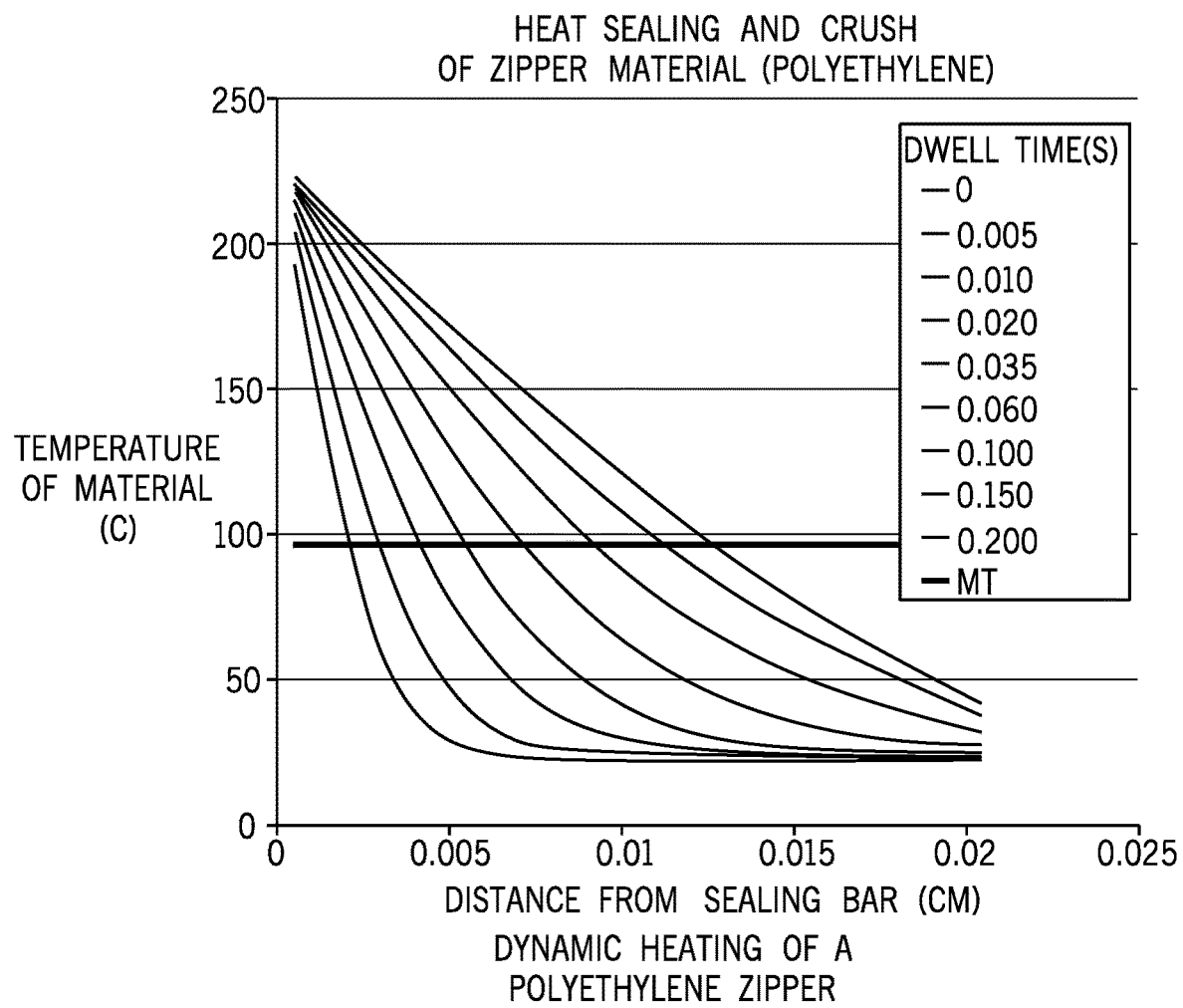
FIG. 8 shows temperature versus depth into polyethylene for various dwell times.

The particular multiphase profile chosen for a particular application should be such that the crush results in a good temperature distribution (closer to uniform, if possible), with even flow of material. FIG. 8 shows temperature of polyethylene for various dwell times and distances from the sealing head. Zero inches is where the head contacts the polyethelene zipper, and the graph shows temperatures for various depths into the zipper.

Figure 3:
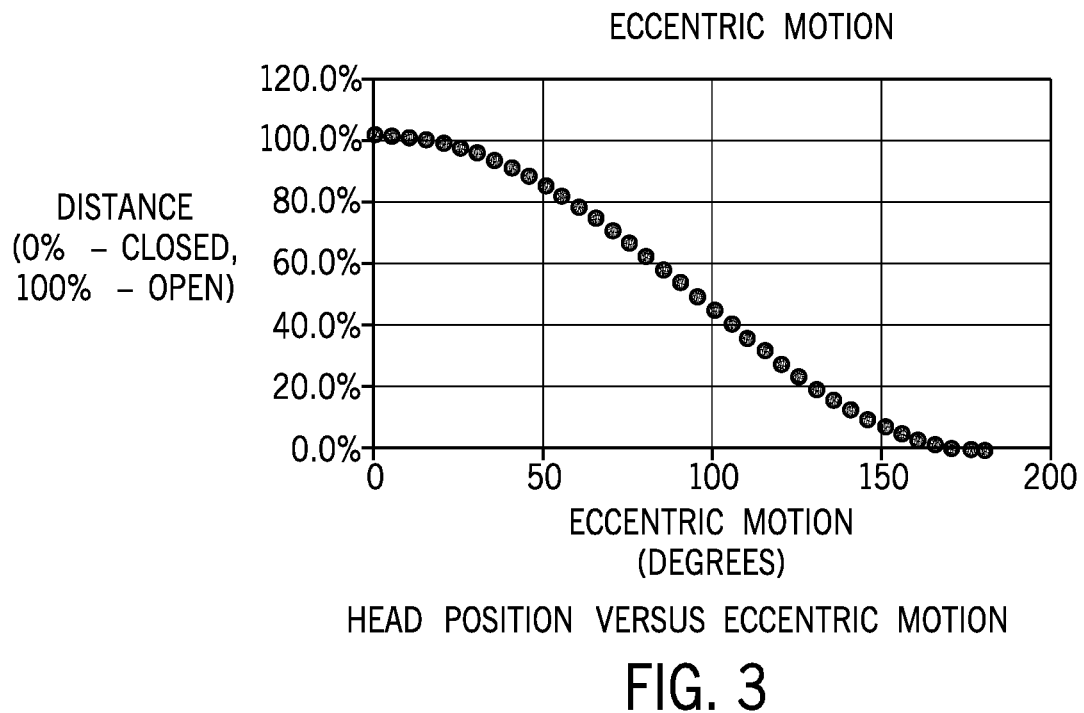
FIG. 3 shows travel and eccentric motion for an eccentric linkage.

An alternative embodiment uses a servo motor with an eccentric linkage to move the platen or head to provide the three phase crush. With the servomotor and eccentric linkage embodiment crushing can be delayed and the rate of crush can be controlled. FIG. 3 shows travel and eccentric motion for the linkage of this embodiment. Fully retracted corresponds to 100% in FIG. 3. The crush sealer will be open from around 3° to 5° all the way to 100% and back down to 3° to 5°.

Figure 4:
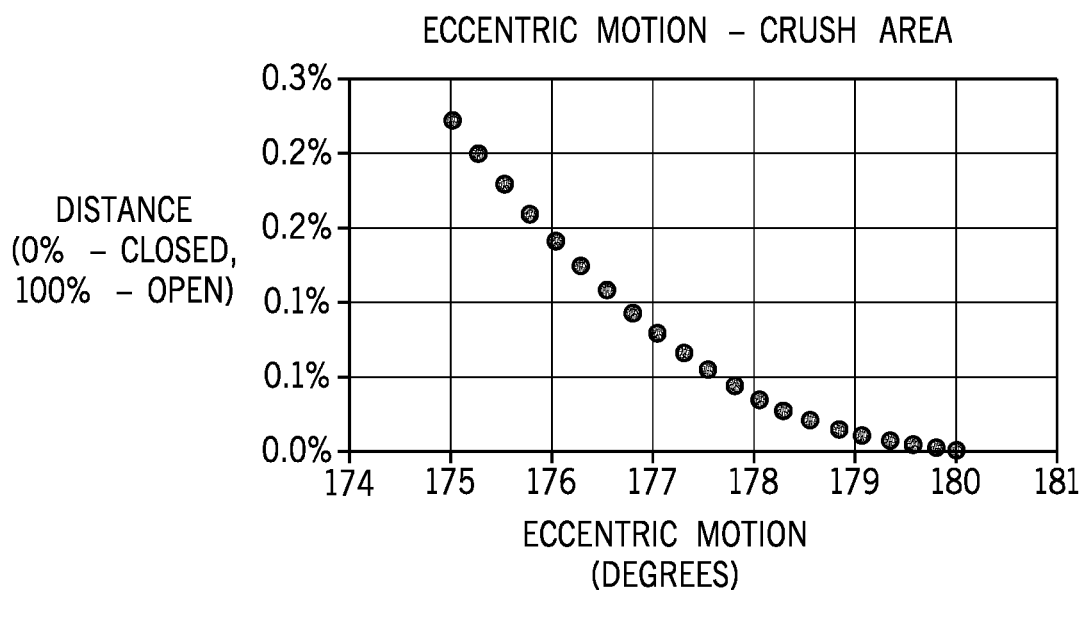
FIG. 4 shows travel and eccentric motion in the crush area for an eccentric linkage.

The pressure is determined by the thickness of the material and stopped position of the platen or sealing head. Pressure increases non-linearly with rotation of the eccentric, and is typically not monitored or controlled. The desired pressure is provided by stopping in the correct position, and the stopping position is dependent of the rotation of the eccentric via the servomotor. Control of the head or platen position is typically best when the eccentric is 175 to 179.5 degrees from top dead center. FIG. 4 shows eccentric motion in the crush area for the eccentric linkage. Fully retracted corresponds to 100% in FIG. 4. The crush sealer will be open from around 3° to 5° all the way to 100% and back down to 3° to 5°.

The anvil is preferably provided with a soft elastomer rubber backing (40 to 60 durometer) to maintain consistent contact across the length of the seal area, and to prevent damage from over travel of the crushing die. Heating will be as desired, without excess pressure to provide consistent strong seals when the head (and thus the servo) is in the proper position. With this alternative there is pre-crush heating and the rate of crush can be controlled, but there is not as precise pressure feedback control as with servo motor torque.

Figure 9:
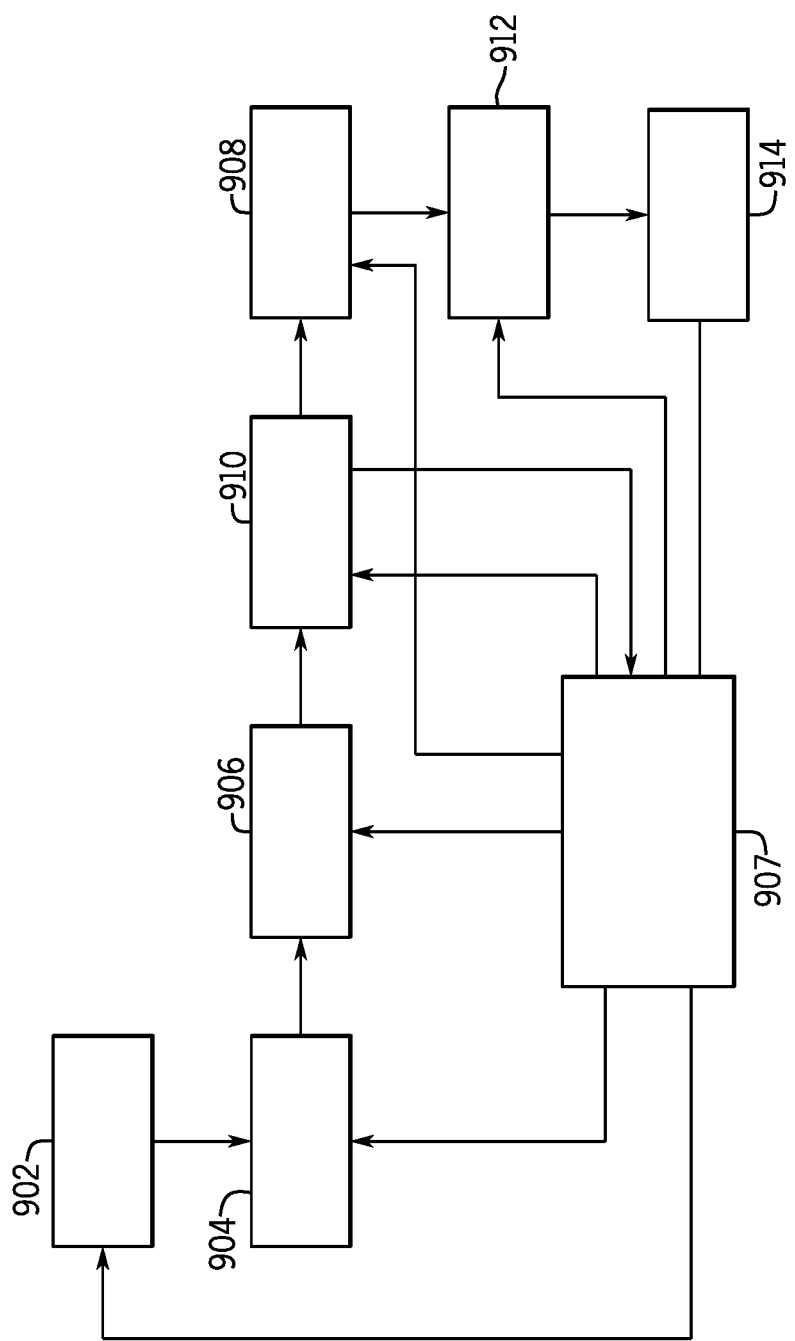
FIG. 9 is a block diagram of a pouch machine.

A pouch machine in accordance with above description is shown in FIG. 9. The pouch machine includes an infeed section 902, that provides a film of material or substrate to a forming or folding section 904. The film follows a film path from forming or folding section 904 to a machine direction bottom seal and zipper flange sealing section 906. The film then follows a path to a zipper crush section 908, that operates as described above. Section 908 is a multiphase insert crushing station. A zipper infeed section 910 (which is part of infeed section 902) provides the zipper strip to the folded film. A side sealing section 912 is downstream of zipper crush section 908, and forms the side seals to the pouch.

Other processes such as cut off, hole punch, etc. are performed by section 914 (and/or additional sections as needed). Additional stations may be included prior to or after multiphase insert crushing station 908. Section 914 is an outfeed section in one embodiment. Film of material, as used herein includes the material fed to a pouch machine that is used to form the pouch and includes laminates, single layer films, and multiple layer films. Infeed section, as used herein refers to the section of a pouch machine that feeds the film of material and/or insert to machine sections that act on the film to form the pouch. Sealing section, as used herein refers to a section of a machine where at least some of the seals used to form a pouch are imparted.

Figure 11:
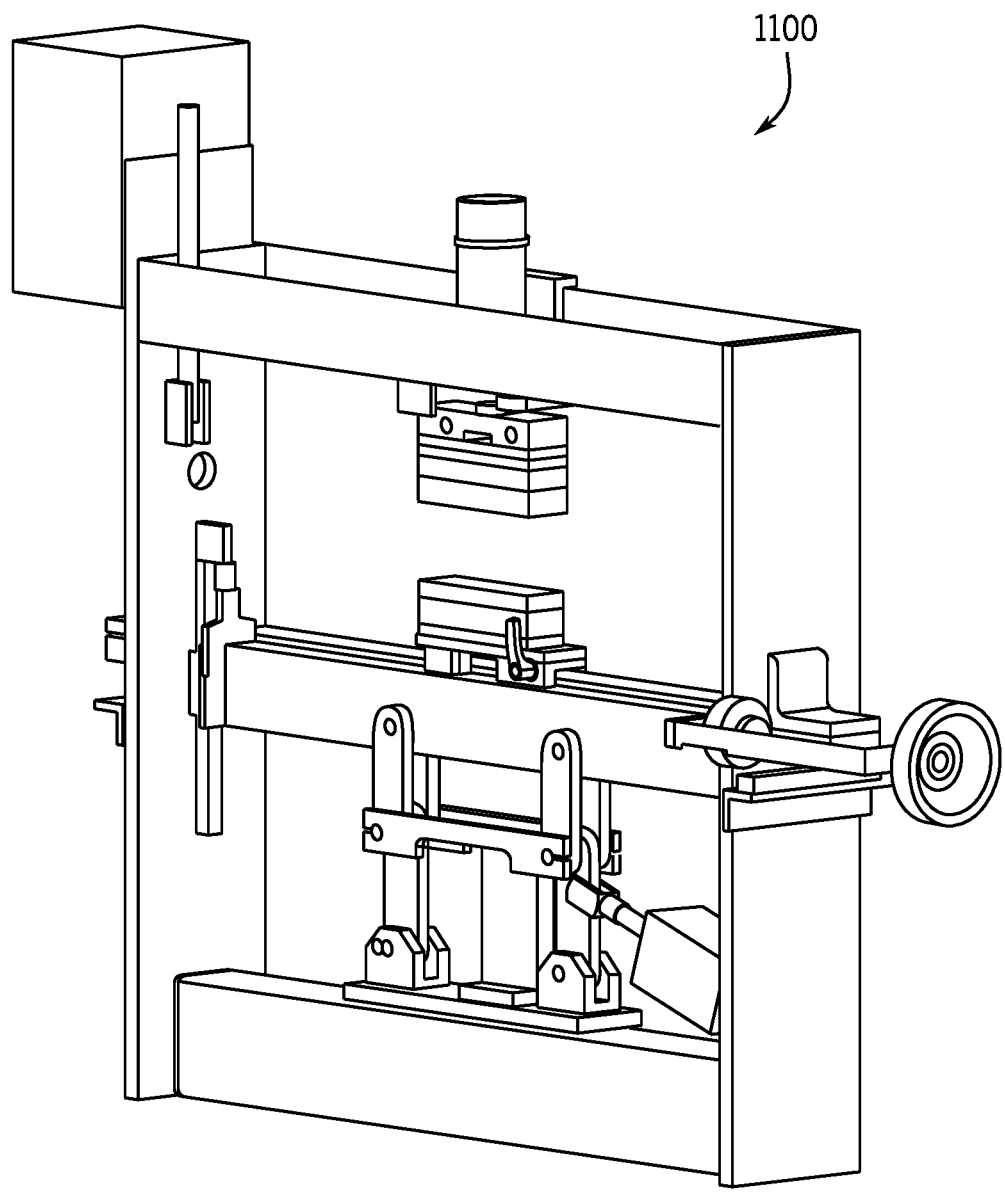
FIG. 11 is a sela head, seal bar, or platen.

Multiphase insert crushing station 908 includes, as described above, a multiphase platen or seal head 1100 (shown in FIG. 11) that preferably provides a three phase crush. Thus, station 908 is a multiphase sealer. A controller 907 controls each section of machine 900. Multiphase platen (or multiphase seal head), as used herein refers to a platen or seal head that forms a seal with a motion profile that includes multiple slopes after the material being sealed is contacted, and/or multiple dwell distances after the material being sealed is contacted. Multiphase sealer, as used herein refers to a sealer that forms a seal with a motion profile that includes multiple slopes after the material being sealed is contacted, and/or multiple dwell distances after the material being sealed is contacted.

Figure 10:
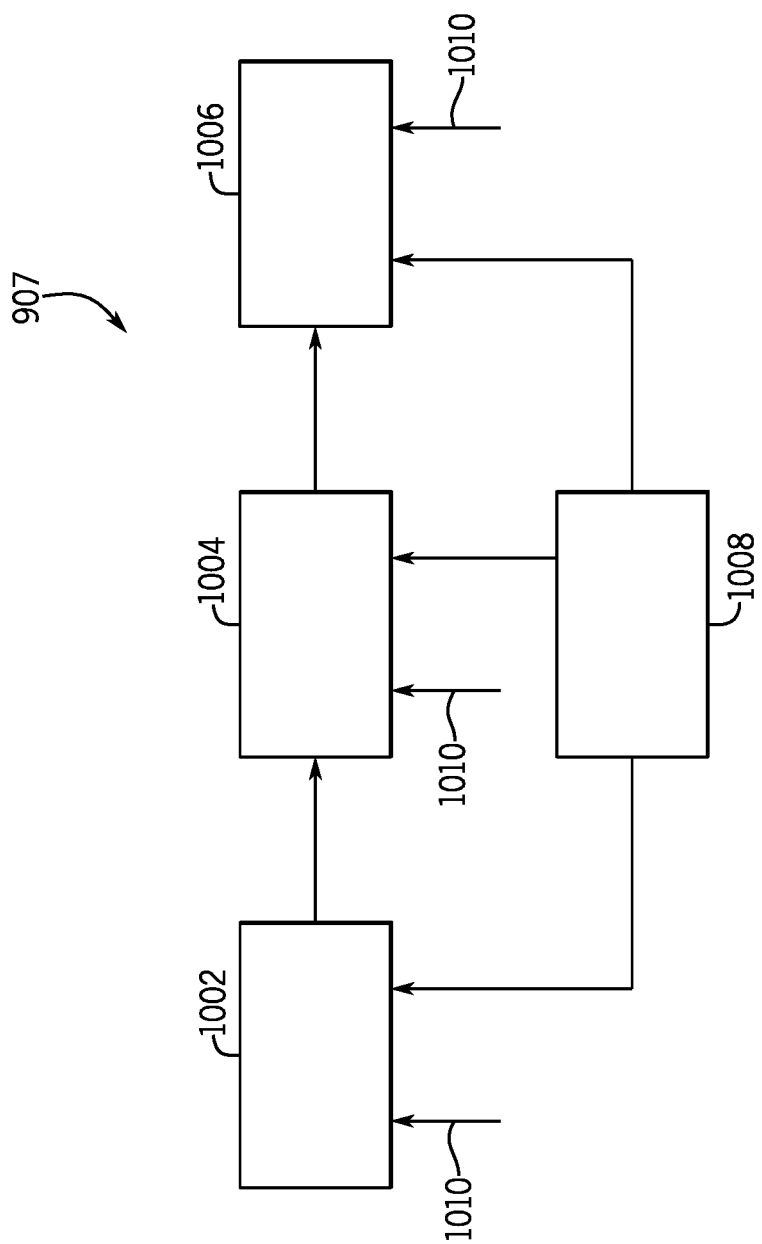
FIG. 10 is a block diagram of part of a controller for pouch machine.

FIG. 10 shows a block diagram of portions of controller 907, that form a multiphase module that controls the motion of the platen in station 908. The multiphase module includes a pre-heating or pre-crush module 1002. After pre-heating module 1002 acts to control the platen or seal head to provide the preheating phase, a controlled crushing module 1004 acts to control the platent to provide the controlled crush phase. After controlled crush module 1004 acts to control the platen to provide controlled crush, a crush setting module 1006 acts to control the platen to provide the crush setting phase. A distance module 1008 controls the platen to move to the desired distance, by providing the desired distances and/or feedback to the other module. Feedback is shown by arrows 1010. Distance module, as used herein refers to a control module that causes a sealer to move a desired distance at a desired speed or speeds. Multi-phase module, as used herein refers to a control module that controls the motion of a sealer and/or platen such that the platen is a multiphase platen and/or sealer. Pre-crushing or pre heating an insert, as used herein refers to heating an insert before applying significant crush pressure to the insert to provide a more uniform temperature profile to lower intermolecular strain and seal shear stress.

Figure 12:
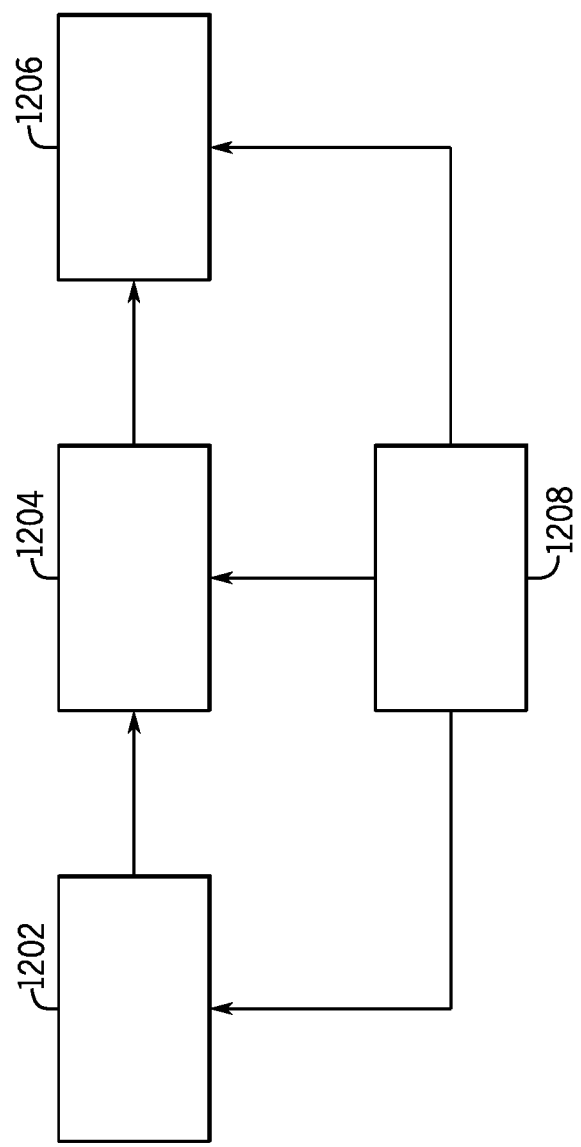
FIG. 12 is a block diagram of a bag machine.

One alternative provides for using the multiphase station to impart a seal other than for an insert. The multiphase station can make high quality and consistent seals with or without an insert. Another alternative provides for a bag machine to have at least some of the seals formed using a multiphase sealer 1204, with at least an upstream infeed section 1202, a downstream outfeed section 1206, and a controller 1208, as shown in FIG. 12.

Another alternative provides for using ultrasonic energy in the multiphase station to crush the insert. The platen (or other device such as a head) can apply ultrasonic energy in a multiphase manner to provide the pre-crush, controlled crush, and crush setting phases.

Numerous modifications may be made to the present disclosure which still fall within the intended scope hereof. Thus, it should be apparent that there has been provided a method and apparatus for making pouches with a multiphase insert crush that fully satisfies the objectives and advantages set forth above. Although the invention has been described using specific embodiments thereof, it is evident that many alternatives, modifications, and variations will be apparent to those skilled in the art. Accordingly, the invention is intended to embrace all such alternatives, modifications and variations that fall within the spirit and broad scope of the appended claims.

The invention claimed is:

1. A method of making pouches, comprising:
   feeding a substrate to an insert crush station;
   feeding an insert to the insert crush station;
   multiphase crushing the insert and substrate; and
   forming seals to create a pouch.

2. The method of claim 1 wherein the multiphase crushing includes at least two of a pre-crush heating, a controlled crushing, and a crush setting, wherein the at least two of the pre-crush heating, the controlled crushing, and the crush setting are consecutive.

3. The method of claim 2 wherein the multiphase crushing includes pre-crush heating, controlled crushing, and crush setting.

4. The method of claim 2 wherein the insert is a zipper.

5. The method of claim 2 wherein the multiphase crushing includes providing heat and does not include providing ultrasonic energy.

6. The method of claim 2, further comprising controlling a second insert crush station that receives the insert and the substrate.

7. A method of making pouches, comprising:
   feeding a substrate to an insert crush station;
   feeding an insert to the insert crush station; and
   controlling an insert crush station to provide at least two of a pre-crush heating, a controlled crushing, and a crush setting of the insert and substrate, wherein the at least two of the pre-crush heating, the controlled crushing, and the crush setting are consecutive.

8. The method of claim 7 wherein providing at least two of the pre-crush heating, the controlled crushing, and the crushing of the insert and substrate, includes providing the pre-crush heating, the controlled crushing, and the crush setting.

9. The method of claim 8, wherein providing an insert includes providing a zipper.

10. The method of claim 7, wherein providing at least two of the pre-crush heating, the controlled crushing, and the crush setting includes providing heat and does not include providing ultrasonic energy.

11. The method of claim 7 further comprising controlling a second insert crush station that receives the insert and the substrate.

\* \* \* \* \*